Figure 1:
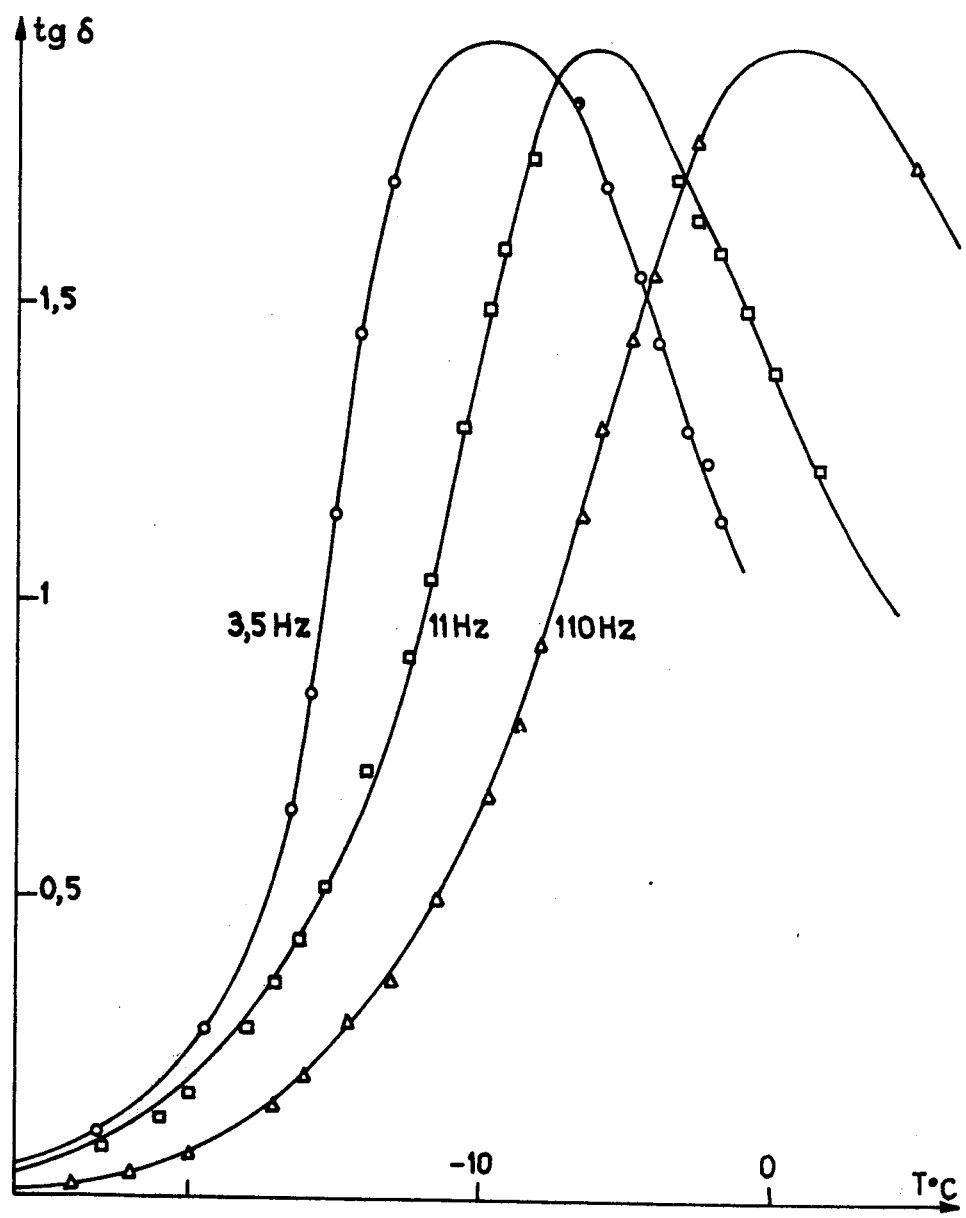

United States Patent [19]

Graveron et al.

[11] 4,118,258

[45] Oct. 3, 1978

[54] VIBRATION DAMPING THROUGH ADHERENCE TO A LAYER COMPRISING POLYISOPRENE AND THE DAMPED STRUCTURE RESULTING

[75] Inventors: Bernard Jacques Graveron, Lyon; Alain Jacques Essel, Caluire, both of France

[73] Assignee: Jean Gole, France

[21] Appl. No.: 786,457

[22] Filed: Apr. 11, 1977

Related U.S. Application Data

[62] Division of Ser. No. 531,326, Dec. 10, 1974, Pat. No. 4,075,288.

[30] Foreign Application Priority Data

Dec. 20, 1973 [FR] France .............................. 73 45839

[51] Int. Cl.$^2$ ...................... B29C 27/30; B32B 15/06; B32B 25/04; B32B 31/06; F16F 15/04
[52] U.S. Cl. ........................................ 156/60; 52/393; 52/403; 156/71; 248/22; 248/358 R; 428/462
[58] Field of Search .................. 52/403, 393; 181/294; 188/268; 248/22, 358 R; 428/461, 462, 463, 466, 492, 500, 521, 909; 156/60, 71

[56] References Cited

U.S. PATENT DOCUMENTS

| 2,935,279 | 5/1960 | La Porte et al. ...................... 248/22 |
| 3,007,692 | 11/1961 | Kniffin .................... 248/22 |
| 3,120,381 | 2/1964 | Sweeney et al. ....................... 248/22 |
| 3,128,682 | 4/1964 | Thompson et al. ..................... 248/22 |
| 3,332,646 | 7/1967 | Kellett .................... 248/22 |
| 3,520,096 | 7/1970 | Kilcher ................................. 248/22 |

FOREIGN PATENT DOCUMENTS

| 2,307,018 | 10/1976 | France ..................................... 428/521 |
| 2,459,357 | 7/1975 | Fed. Rep. of Germany ........... 428/521 |

*Primary Examiner*—James C. Cannon
*Attorney, Agent, or Firm*—Bucknam and Archer

[57] ABSTRACT

Polyisoprenes having a minimum of 60% of 1,2- and 3,4-vinyl structures are useful as vibration-damping materials.

The polyisoprenes are used individually or as a mixture with inorganic or organic fillers, or in the form of block copolymers.

7 Claims, 5 Drawing Figures

VIBRATION DAMPING THROUGH ADHERENCE TO A LAYER COMPRISING POLYISOPRENE AND THE DAMPED STRUCTURE RESULTING

This is a division of application Ser. No. 531,326, filed Dec. 10, 1974 now U.S. Pat. No. 4,075,288.

The present invention relates to materials which can be used for damping vibrations.

Three techniques are generally used in order to counteract vibrations. The first, known as insulation, involves separating the source which generates vibrations from the rest of the structure by means of an elastic element. Above the resonance frequency of the system, the amplitude of the transmitted vibration is less than the amplitude of the excitation vibration. If, moreover, the elastic element possesses a significant damping coefficient, the amplitude under resonance conditions is considerably decreased, provided that the material possesses a moduls which is independent of the frequency. Since it is generally desired to have a resonance frequency which is as low as possible, the materials should possess a low modulus but, of course, the modulus should be sufficient to withstand the static load to be supported.

The second technique, absorption, used to control vibrations within a limited frequency range, combines reactive masses with elastic and dissipatory elements. Since absorption depends on the degree of coupling between the frequency of the absorber and the frequency of the resonating system. Materials are used which possess both a high damping coefficient and a low, or very low, modulus.

The third technique involves attaching the source to a structure which has a damping effect. In this case, part of the vibration energy is absorbed by this structure and converted to heat. The structure can be produced using special metal alloys, but the damping coefficients of these alloys rarely exceed a few hundredths and the proportion of energy absorbed is low. Under certain conditions which will be specified hereafter, some macromolecular materials possess damping coefficients which exceed one. However, since the modulus of these materials is low, they must be used in a composite structure which combines them with a metal which provides static rigidity. The damping coefficient of the composite can then be as much as several tenths and the effectiveness of such structures can be high.

Three main types of composite structures are used at the present time.

(1) A simple covering on a layer of metal of a layer of anti-vibration material which, in this case, works under tension and compression. The composite damping coefficient of such a structure depends, in the first place, on the damping coefficient of the antivibration material, but also on its modulus and on the ratio of the thickness of anti-vibration material to the thickness of metal. In order to obtain a high composite damping coefficient, the value of this ratio must be high, and this limits the use of these structures, in the case where the static load is low (low thickness of the metal layer), to the damping of associated plates, such as casing plates, in order to reduce the noise emitted by the latter.

(2) Sandwich structures: a second metal plate, a so-called stress backing-plate, is added to structure (1) and the purpose of this second metal plate is to make the material work under shear. The composite damping coefficient of such structures is markedly higher than that of structure (1), so that thinner layers of anti-vibration material may be used. It is obvious that these structures can be symmetrical (the thickness of the plate and of the back-plate being the same) or asymmetrical, that they can comprise a single layer or many layers of anti-vibration material and that they can have various shapes. The necessary characteristics and the cost price will provide the user with a guide as to the size and as to the choice from amongst the various types.

(3) "Inserts": the anti-vibration material is introduced into cavities, the positions and sizes of which are carefully chosen, and which are formed in the structure which can have any desired shape. The cost of this type of structure is higher than that of the two described above, and this type of structure is generally reserved for the case where the load is high.

In order to be satisfactory, an anti-vibration material must possess at least three basic properties.

In the first place, of course, such a material should have a high damping coefficient ($\tan\delta$) within the widest possible temperature and frequency ranges.

The damping coefficient is the tangent of the phase displacement angle between the stress and the deformation when the material is subjected to a sinusoidal stress. An amorphous macromolecular material possesses a high damping coefficient when it is in the transition zone between the vitreous state and the rubbery state.

If the variation of the damping coefficient is plotted against the temperature at a fixed frequency, a peak is observed in the damping coefficient the width of which varies depending on the particular material, and if the relationship $\tan\delta \leq 1$ is taken as the criterion (and this is an accepted performance criterion, although the criterion $\tan\delta \leq 0.5$ is also employed), it is possible to obtain a temperature range within which the material is effective of about 20° C. If the damping coefficient is plotted as a function of the frequency, at a fixed temperature, a peak in the damping coefficient is again observed but the sharpness of this peak is markedly lower, and so the criterion employed can be satisfactory over several tens of units. Consequently, in order to be completely effective, an anti-vibration material must have a transition temperature (or temperature maximum of $\tan\delta : Tm$), in the stress vibrations frequency range, close to the use temperature. In the great majority of cases, these products will be used to damp sound frequencies, and more particularly frequencies between 10 and 1,000 Hertz, at ambient temperature. It is thus necessary for the material to have its damping maximum at about ambient temperature, for this frequency range.

A second desirable characteristic is that the value of the modulus of the material should be capable of being varied over a wide range. In insulation, the material must have a modulus ranging from low to high depending on the load to be supported. In absorption, materials with allow modulus will generally be used. In the case of a simple covering, theory shows, on the other hand, that the higher the modulus, the better the performance of the composite. A simple calculation in accordance with the OBERST model — H. OBERST and K. FRANKENFELD, *Acustica*, 4 (1952) AB181 — shows that for a simple covering with a thickness ratio of steel to antivibration material of 1:2, if the Young's modulus of the anti-vibration material is $5 \times 10^7 \text{ N/m}^2$, which represents an average value for such materials, the ratio of the damping coefficient of the composite to the damping coefficient of the material is $1.6 \times 10^{-2}$. If a material with a Young's modulus of $5 \times 10^8 \text{N/m}^2$ is used, this ratio changes to 0.14. In the case of a sandwich structure, it has been shown that the optimum performance is achieved for high modulus values — R. DIETZEL, Hochfrequenz. Techn. u Elcktoakust 76 (1967) 189. The same applies in the case of inserts.

A third desirable property is that of good stability under static load. It is known that in the use zone, and for the deformations which are imposed, an anti-vibration material is viscoelastic. If the material consists of a linear polymer, it will possess a significant tendency to creep. When used in a sandwich, such a material has a tendency to escape under the effect of an applied load, thus changing the thickness of the damping layer and consequently the characteristics of the sandwich. This effect is further magnified when the temperature at which the material is employed is higher than the optimum temperature, because the material is in its rubbery zone so that the viscous character of the material is increased. If the polymer is crosslinked, although it may possess values of elastic moduli identical to those of the linear polymer, the interchain bonds considerably reduce the creep and increase the cohesion of the material; in the rubbery zone, the material possesses an elastic character. These three effects have the result that a sandwich structure produced with such a material will retain dimensional stability (under virtually static deflection) substantially irrespective of what the load is or what zone the material is in. This is also true in the case of a simple covering; this is of prime importance in the case of a damped elastic contact block, but is less necessary in the case of inserts where the static load is practically zero and in this case a linear polymeric material of sufficiently high molecular weight can be used.

In addition to these three basic properties, it is of prime importance that the anti-vibration materials should adhere well to metals. Whether the material works under tension and compression or under shear, the adhesion between the metal and the product must be as good as possible, because any slip manifests itself in a loss of efficiency.

Finally, it is necessary for anti-vibration materials to possess good resistance to aging and good resistance to fatigue.

We have now found that polyisoprenes which have a high proportion, greater than 60%, of vinyl groups, possess particularly good vibration-damping properties.

According to the invention, there is provided a vibration-damping material, which comprises polyisoprene containing at least 60% of 1,2- and 3,4-structures.

For the usual frequency range of between 10 and 1,000 Hertz, the material of the invention exhibit good damping characteristics within the temperature range at which the material is usually employed, that is to say between 0° and 40° C.

Preferably, the polyisoprenes have from 60 to 95% of vinyl chains.

The polyisoprenes with vinyl chains of the invention contain 1,2- and 3,4-isoprene structures of the formulae:

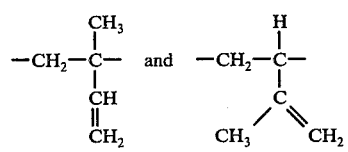

The polyisoprenes can be used alone or as a mixture with inorganic or organic fillers, or in the form of copolymers. They are preferably crosslinked.

Various fillers may be added to the polyisoprene depending on the intended use of the material. Thus, when simple coverings, which require material with a high modulus, are being manufactured, carbon blacks are preferably added to the polyisoprene. When preparing sandwiches, which only require a material with a modulus of average value (that is, about $10^7$ N/m$^2$), a polyisoprene containing no filler is suitably employed.

Figure 2:
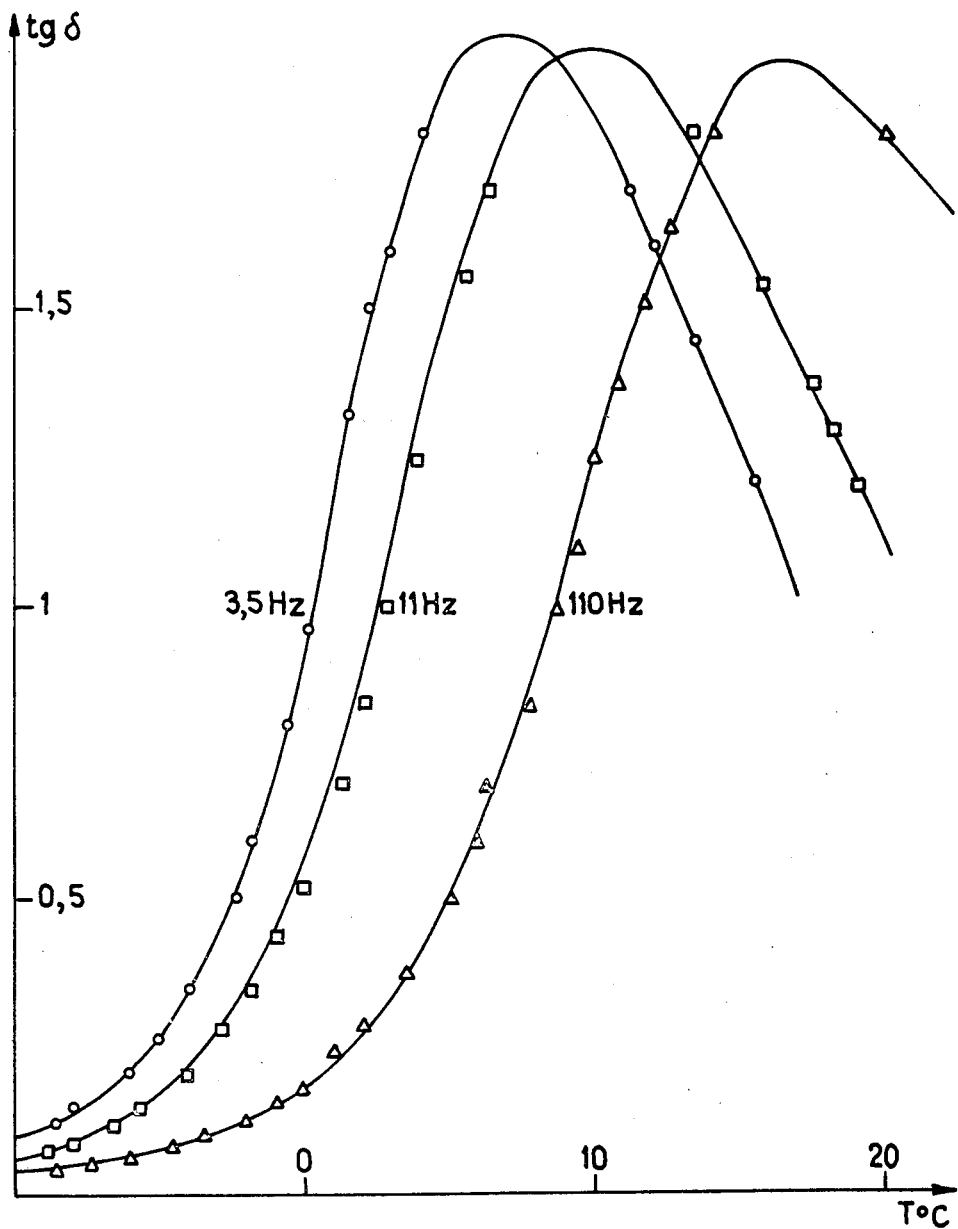
Figure 3:
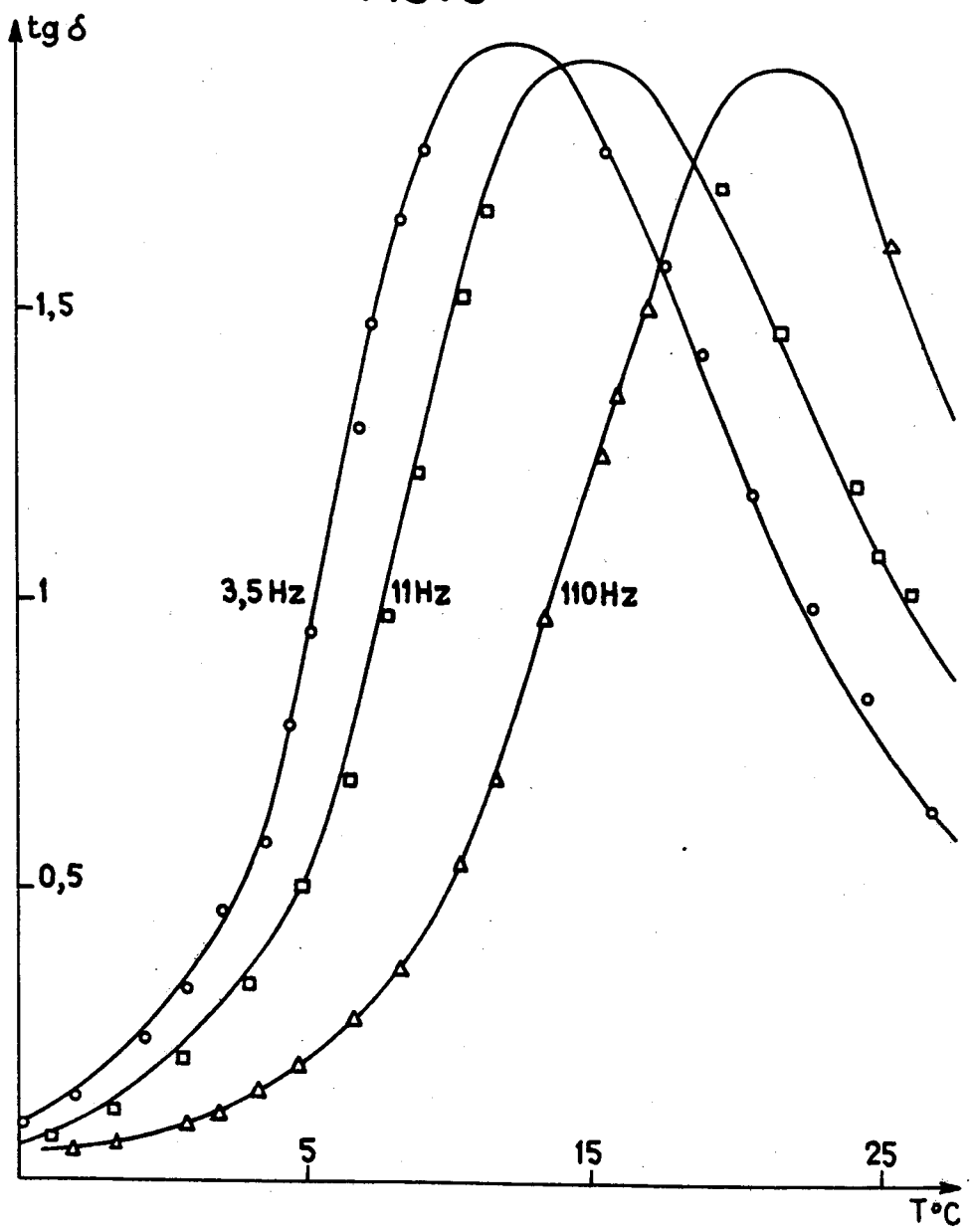

FIGS. 1, 2 and 3 are plots of the damping coefficient as a function of temperature as is described in detail in Example 1.

Figure 4:
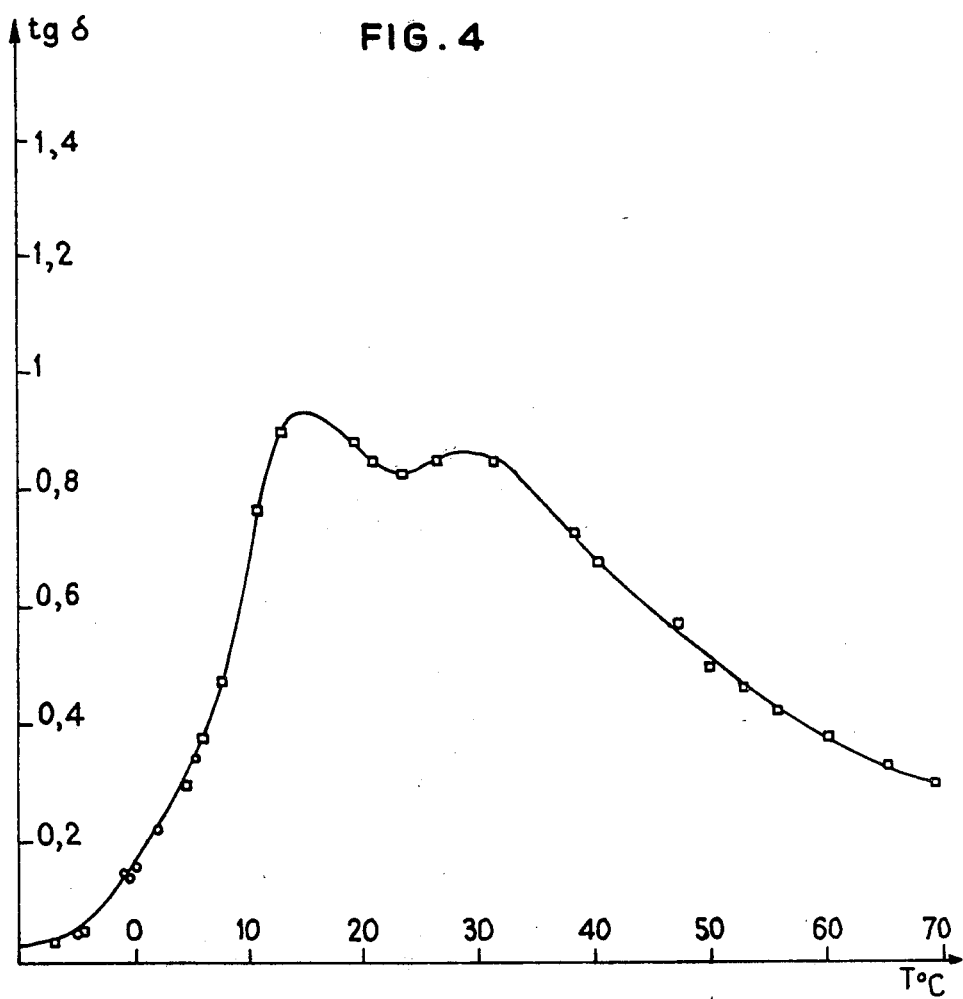

FIG. 4, further described in Example 6, is a plot of the damping coefficient as a function of temperature.

Figure 5:
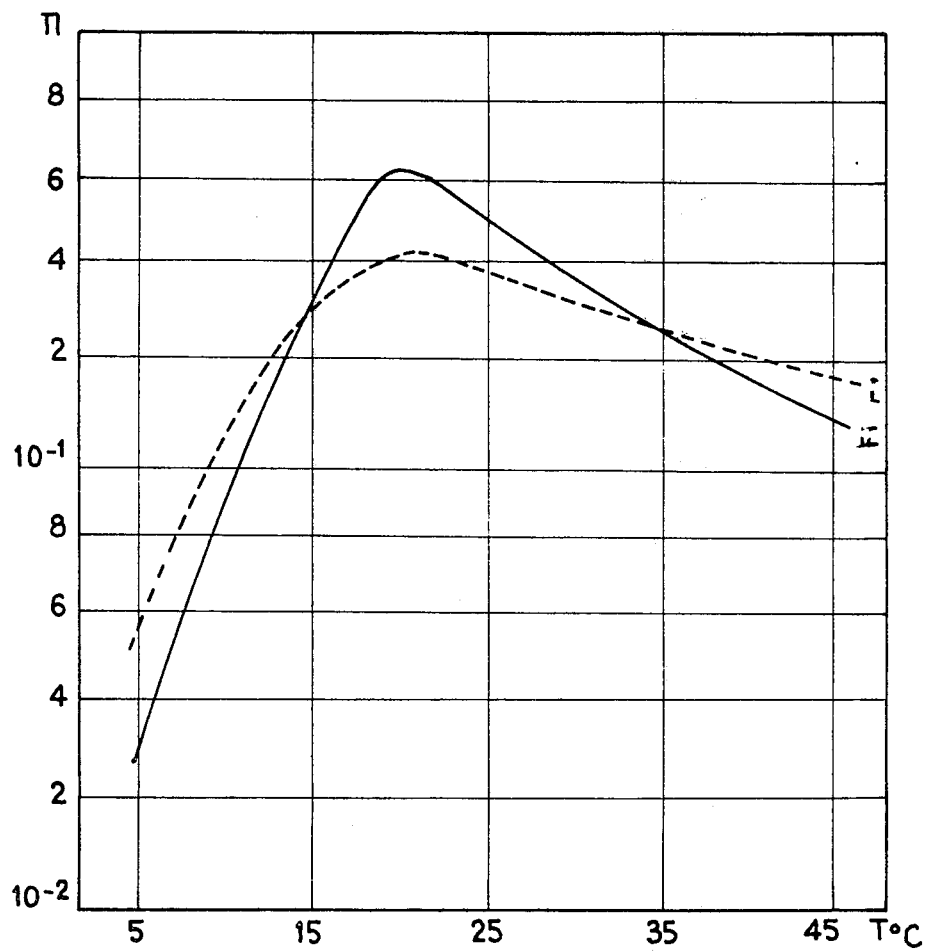

FIG. 5 is a plot of the variation of the composite damping coefficients of sandwiches with temperature as is discussed in Example 8.

In order that the invention may be more fully understood, the following Examples are given by way of illustration only:

EXAMPLE 1

A series of unvulcanised polyisoprenes of the following compositions were compared:

| Product | Proportion of vinyl bonds | 1,4-cis | 1,4-trans | 1,4-total | 1,2- | 3,4- |
|---|---|---|---|---|---|---|
| 1 | 0 | | | 100 | | |
| 2 | 12 | 24 | 64 | | 5 | 7 |
| 3 | 40 | 15 | 45 | | 8 | 32 |
| 4 | 62 | | | 38 | 5 | 57 |
| 5 | 75 | | | 25 | 33 | 42 |
| 6 | 85 | | | 15 | 15 | 70 |

Products 4 to 6 are polyisoprenes used according the the invention: Products 1 to 3 which are not polyisoprenes of the invention are included by way of comparison.

The conditions used in the preparation of the polyisoprenes were as follows:

| Product | Primes | Solvent | Polymerisation temperature, °C | Notes |
|---|---|---|---|---|
| 1 | | | | Natural rubber |
| 2 | | | 50 | Emulsion polymerisation |
| 3 | Potassium | Hexane | 15 | Anionic polymerisation |
| 4 | Naphthalene-potassium | Dioxane | 15 | " |
| 5 | Naphthalene-lithium | Dimethoxy-ethane | 15 | " |
| 6 | Naphthalene-lithium | 2,5-Dimethyl-tetrahydrofuran | 15 | " |

The system used for the emulsion was:

Potassium persulphate:0.5% by weight
Potassium laurate:1% by weight
Lauryl mercaptan:0.1% by weight
Ratio of isoprene to water:0.67

The numerical average molecular weights of products 2 to 6 were between 140,000 and 170,000.

The glass transition temperature (Tg), measured by differential thermal analysis (3° C per minute), and the temperature maximum of tanδ at 110 Hz are given in the following Table. The figures in the second column of the Table correspond to the temperature at which maximum damping is observed for the frequency of 110 Hz.

| Product | Tg ° C | $T_{110}$ ° C |
|---|---|---|
| 1 | −72 | −60 |
| 2 | −60 | −50 |
| 3 | −43 | −16 |
| 4 | −24 | 0 |
| 5 | −15 | 16 |
| 6 | −11 | 23 |

It is seen that only products 4, 5 and 6, which are polyisoprenes of the invention, possess a temperature maximum of tanδ at 110 Hz within the range of commonly occurring temperatures.

Plots of the variation in the value of tanδ as a function of the temperature at 3.5, 11 and 110 Hz are shown in FIGS. I to III, which correspond respectively to products 4, 5 and 6.

The measurements were made using a RHEOVIBRON DDV-II apparatus.

EXAMPLE 2

A polyisoprene containing 70% of vinyl double bonds was prepared by polymerisation using naphthalene-potassium in tetrahydrofuran at 30° C. The numerical average molecular weight was 150,000. This polyisoprene was vulcanised using the following formulations:

|  | Product 7 | Product 8 | Product 9 |
|---|---|---|---|
| Polyisoprene | 100 | 100 | 100 |
| Zinc oxide | 5 | 5 | 5 |
| Stearic acid | 3 | 3 | 3 |
| N-Phenyl-N-"-isopropyl-p-phenylene-diamine (antioxidant) | 2 | 2 | 2 |
| Sulphur | 2.5 | 1.4 | 0.33 |
| N-Cyclohexyl-2-benzothiazole-2-sulphenamide (CBS) | 0.5 | 1.73 | 3 |
| 1,3-Diphenyl-guanidine (DPG) | — | 0.33 | — |
| Tetramethyl-thiurane disulphide (THTD) | — | — | 2 |

The maximum tan δ values and the temperatures for maximum tanδ at 400 Hertz (in ° C) for these three products were:

|  | Product 7 | Product 8 | Product 9 |
|---|---|---|---|
| tan δ max (1) | 2.0₅ | 1.9₅ | 1.8 |
| $T_{400}$ (1) | 23.₅ | 23 | 17.₅ |

(1) Measured in accordance with the method described by Martinat (Mesure, 34, 1969, page 104).

It was observed that vulcanisation improved the stability under static load as well as the resistance to aging, without having an adverse effect on the antivibration properties.

EXAMPLE 3

Using the polyisoprene described in the preceding Example, a vulcanised product filled with carbon black, having the following composition, was produced:

| Product 10 |  |
|---|---|
| Polyisoprene | 100 |
| Zinc oxide | 5 |
| Stearic acid | 3 |
| Antioxidant | 2 |
| ISAP-HS carbon black | 50 |
| Paraffin oil | 5 |
| Sulphur | 3.5 |
| CBS | 0.7 |

This product was compared with an otherwise similar composition (product 11) prepared without using the carbon black and paraffin oil.

The following values were obtained for maximum tanδ and for the elastic modulus at 25° C (temperature maximum tan δ at the measuring frequency of 400 Hz).

|  | Elastic modulus | tan δ max (1) |
|---|---|---|
| Product 10 | $1.6 \times 10^8$ N/m² | 1.1 |
| Product 12 | $3.8 \times 10^7$ N/m² | 2.35 |

(1) Measured as in Example 2.

The result of adding carbon black to the polyisoprenes was thus to increase the elastic modulus and increase the static modulus and thus provide better stability under load, whilst retaining values of tanδ greater than 1.

EXAMPLE 4

Using the polyisoprene described in Example 2, a vulcanised product filled with calcium carbonate, having the following composition, was produced:

| Product 12 |  |
|---|---|
| Polyisoprene | 100 |
| Zinc oxide | 5 |
| Stearic acid | 3 |
| Antioxidant | 2 |
| Calcium carbonate | 75 |
| Paraffin oil | 5 |
| Sulphur | 3.5 |
| CBS | 0.7 |

This product was compared with product 11 described in Example 3.

The following values were obtained for maximum tanδ and for the elastic modulus at 25° C (temperature maximum tanδ at the measuring frequency of 400 Hz).

|  | Elastic Modulus | tan δ max (1) |
|---|---|---|
| Product 12 | $8.8 \times 10^7$ N/m² | 2.1 |
| Product 11 | $3.8 \times 10^7$ N/m² | 2.35 |

(1) measured as in Example 8.

The damping effect thus remained very high in the case of the product filled with calcium carbonate; moreover, the value of the elastic modulus was slightly higher, and this was achieved at lower cost than in the case of the pure rubber mixtures (products 7, 8, 9 and 11) or even the mixtures filled with carbon black (product 10).

EXAMPLE 5

Vulcanised products comprising 50/50 mixtures of the polyisoprene described in Example 2 with natural rubber, an SBR rubber and a butyl rubber, were prepared using a formulation otherwise similar to that of product 11. The following Table summarises the characteristics obtained using these mixtures:

| | 50/50 mixtures | $T_{400}$ | tan δ max (3) |
|---|---|---|---|
| Product 13 | Polyisoprene - natural rubber | $13_{-3}$ | 1.3 |
| Product 14 | Polyisoprene - SBR 1500 (1) | $14_{-3}$ | 1.0 |
| Product 15 | Polyisoprene - butyl rubber 301 (2) | $14_{-5}$ | 1.6 |

(1) Sold commercially by POLYSAR - FRANCE
(2) Sold commercially by SHELL - FRANCE
(3) Measured as in Example 2.

EXAMPLE 6

A block copolymer of polybutyl methacrylate, polyisoprene and polybutyl methacrylate comprising the blocks in the weight proportions 20 - 60 - 20 (product 17), was prepared. The polyisoprene had 75% of vinyl bonds.

FIG. IV shows the variation in the damping coefficient of this product as a function of the temperature at a frequency of 3.5 Hz, measured on a RHEOVIBRON DDV - II apparatus.

The advantage of this type of block copolymer is mainly the fact that a much wider peak is obtained, corresponding to a much wider temperature range, whilst retaining a large vibration damping effect.

EXAMPLE 7

A simple covering was prepared by attaching a layer of elastomer to a support. The composition of the elastomer was that of Example 4, that is to say a vulcanised polyisoprene filled with calcium carbonate.

A 4 mm thick layer of this elastomer was glued to a 2 mm thick steel plate. The adhesive used was CHEMOSIL 220 (trademark registered by HENKEL), coated on the metal which had previously been treated by sand blasting.

The following variation with temperature in the composite damping coefficient (η) at 75 Hertz of the covering thus formed was observed.

| Temperature ° C | 5 | 15 | 25 | 35 | 45 |
|---|---|---|---|---|---|
| η | 0.15 | 0.035 | 0.916 | 0.014 | 0.010 |

EXAMPLE 8

A first sandwich consisting of a layer of polyisoprene formed of product 10 of Example 3, that is to say a vulcanised polyisoprene filled with carbon black and a second sandwich which was identical except that it was produced from product 11 were prepared. The polyisoprene layer was 2 mm thick and was inserted between two steel plates each 2 mm thick. The adhesive used was the same as in Example 7.

The variation in the composite damping coefficient (η) of the sandwiches with temperature at an average frequency of 100 Hz is illustrated in FIG. V, curve I corresponding to the sandwich formed with product 10, and curve II corresponding to the sandwich formed with product 11.

What is claimed is:

1. A method of damping vibrations which consists of attaching to the element which causes vibrations a layer of vibration-damping material which comprises polyisoprene in which the total percentage of 1,2- and 3,4-vinyl structures is at least 60%.

2. The method according to claim 1 which comprises interposing between said element which causes vibrations and a second element to which the vibrations are transmitted said vibration-damping material which comprises said polyisoprene.

3. The method according to claim 1 wherein said vibration-damping material comprises at least one filler.

4. The method according to claim 1 wherein said polyisoprene is in the form of a block copolymer of polybutyl methacrylate, polyisoprene and polybutyl methacrylate in the weight proportion of 20-60-20.

5. The method according to claim 1 wherein said layer comprises polyisoprene mixed with natural rubber, polyisoprene mixed with styrene-butadiene copolymer or polyisoprene mixed with a butyl rubber in the proportion of 50% by weight of polyisoprene.

6. A support having a layer of a material which comprises polyisoprene containing at least 60% of 1,2- and 3,4-structures.

7. A sandwich structure which comprises two support plates and sandwiched therebetween a material which comprises polyisoprene containing at least 60% of 1,2- and 3-4-structures.

* * * * *